(12) United States Patent
Tsurufuji

(10) Patent No.: US 6,871,441 B1
(45) Date of Patent: Mar. 29, 2005

(54) APPARATUS FOR MOUNTING REEL ON FISHING ROD

(75) Inventor: Tomoyoshi Tsurufuji, Saitama (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 09/517,009

(22) Filed: Feb. 28, 2000

(30) Foreign Application Priority Data

Jun. 8, 1999 (JP) .......................................... 11-160802

(51) Int. Cl.[7] .............................................. A01K 87/06
(52) U.S. Cl. ..................................................... 43/22
(58) Field of Search ............................................. 43/22

(56) References Cited

U.S. PATENT DOCUMENTS 6,357,165 B1 * 3/2002 Lu .............................. 43/18.1

FOREIGN PATENT DOCUMENTS

| JP | 10-52195 | | 2/1998 | |
|----|----------|----|--------|------|
| JP | 10 521195 | * | 10/1998 | ............... 43/22 |

* cited by examiner

Primary Examiner—Kurt Rowan
(74) Attorney, Agent, or Firm—Liniak, Berenato & White

(57) ABSTRACT

In an apparatus for mounting a reel on a fishing rod, a moving hood and a nut member respectively have contact surfaces which are brought into contact with each other. The outer sites in the diametrical direction of the respective contact surfaces are formed as pressure contact surfaces which are forced to contact each other when a fishing-reel fitting leg portion is clamped between a first and a second retaining portion by the clamping and pivotal operation of the nut member with respect to a seat body. The inner sites in the diametrical direction of the respective contact surfaces are formed into a click mechanism for producing a click sound with an elastic body and an engaging portion with which the elastic body detachably engages therewith during the rotation of the nut member.

8 Claims, 6 Drawing Sheets

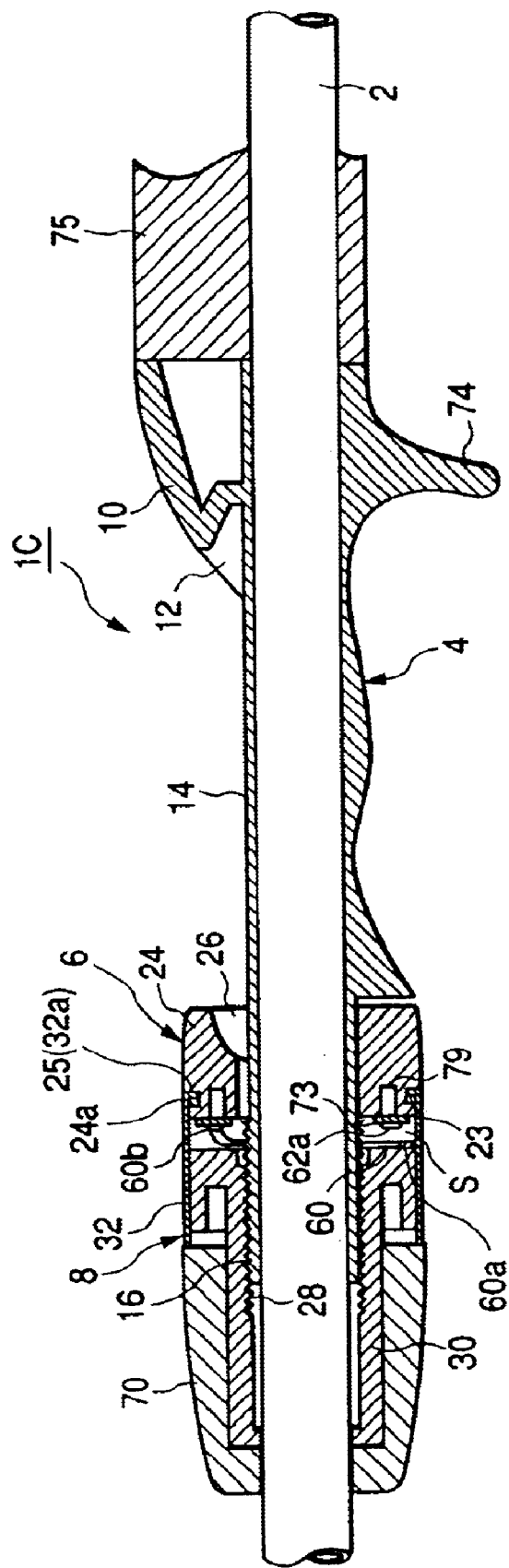

APPARATUS FOR MOUNTING REEL ON FISHING ROD

BACKGROUND OF THE INVENTION

This invention relates to nut-type reel mounting apparatus which are provided for fishing rods and more particularly to a reel mounting apparatus having a click mechanism for generating a click sound by rotating nuts.

Nut-type reel mounting apparatus for fishing rods are generally called reel seats provided to cylindrical seats and casting handles. Such a reel mounting apparatus comprises a seat body having a retaining portion for retaining one side of a fishing-reel fitting leg portion and a male screw portion, a moving hood having a retaining portion for retaining the other side of the fishing-reel fitting leg portion, and a nut member which has a female screw portion and is used for moving the moving hood along the seat body. Incidentally, the seat body is formed integrally with the fishing rod or formed separately therefrom and then fixed to the fishing rod.

In the reel-mounting apparatus thus arranged, the nut member is rotated while the one side of the fishing-reel fitting leg portion is retained by the retaining portion of the seat body. When the retaining portion of the moving hood is set close to the retaining portion of the seat body, the other side of the fishing-reel fitting leg portion is retained by the retaining portion of the moving hood. The nut member is then clamped (rotated) in this state to force the nut member to contact the moving hood, whereby the fishing-reel fitting leg portion is strongly clamped by both the retaining portions of the moving hood and the seat body. Thus, the fishing reel is firmly fixed to the fishing rod.

However, some of the reel-mounting apparatus are equipped with slackening preventive mechanisms for preventing nut members from being loosened. For example, JP-A-10-52195 discloses a reel mounting apparatus having a slackening preventive mechanism including a plurality of round holes provided on a nut member side and arranged along the peripheral direction of the nut member, and positioning pins provided on a moving hood side and urged by a spring toward the holes. In the reel mounting apparatus, the nut member is prevented from being loosened when the positioning pins are retained by the holes and as the nut member rotates, the positioning pins are repeatedly attached to and detached from the holes with the effect of producing click sounds.

The click sound produced as the nut member rotates is useful in that the user is informed of the clamped condition of the nut member and the like. However, because the slackening preventive mechanism functions mainly as a nut member stopper, there arise some problems when the mechanism is utilized for causing the click sound. The problems will now be described with the slackening preventive mechanism hereinafter called a click mechanism.

As mentioned above, the click mechanism in the reel-mounting apparatus disclosed in JP-A-10-52195 is mainly intended for utilization as a nut member stopper. Consequently, the moving hood is forced to contact the nut member via the click mechanism, and the rotation of the nut member relative to the moving hood is regulated by the retained condition between the positioning pins and the holes that are kept in contact with each other.

In the reel-mounting apparatus disclosed in JP-A-10-52195, moreover, a projected portion diametrally projecting outward is formed in a part of the moving hood in order to separately secure a space for the click mechanism. The positioning pins are disposed in the projected portion and a ring portion having holes for retaining the positioning pins is secured to the nut member and positioned between the moving hood and the nut member, that is, in the pressure contact portion between the moving hood and the nut member.

However, the formation of the projected portion for use in disposing the positioning pins in part of the moving hood like this results in forming a difference in level on the outer surface of the moving hood, thus posing a problem in that the fingers may be caught by the difference in level during the operation (at the time of fishing) (or deteriorating the operability).

According to the prior art disclosed in JP-A-10-52195, as the click mechanism is made to function as the pressure contact portion, the click sound may be lowered or may not be produced when the nut member is strongly clamped (the nut-member clamping condition may not be notified by the sound).

According to the prior art disclosed in JP-A-10-52195, further, the nut member is stopped from rotating by the pressure contact force between the positioning pins and the holes. When a great load is applied to the positioning pins in their pivotal direction because of the excessive tightening of the nut member, the nut member may be secured too firmly and may not be loosened. Therefore, the durability of the click mechanism is lowered and this would make its long-term use difficult.

According to the prior art disclosed in JP-A-10-52195, further, the outer peripheral portion of the ring portion where the holes are formed is diametrally projected outward from the moving hood like the projected portion so as to face the projected portion (so as to retain the positioning pins by the holes). Accordingly, the outer peripheral sites of the ring portion without facing the projected portion are left exposed outwardly in the diametral direction of the moving hood. In other words, some of the holes free from engaging with the positioning pins are left exposed outwardly. Therefore, there is the possibility that dust, sand and the like may enter the holes disengaging from the positioning pins at the time of fishing or otherwise the fingers soiled with krill and the like may touch the ring portion and clog the holes therewith, thus causing the nut member to malfunction (not pivot).

SUMMARY OF THE INVENTION

An object of the present invention made in view of the situation above is to provide a reel-mounting apparatus that is capable of always causing a good click sound and excellent in durability as well as operability without causing any malfunction resulting from the intrusion of impurities.

In order to solve the problems above, a reel-mounting apparatus for mounting a reel on a fishing rod according to a first aspect of the invention, which apparatus comprises a seat body having a first retaining portion which is provided to the fishing rod and used for receiving and retaining one side of a fishing-reel fitting leg portion, a moving hood which is fitted to the outer periphery of the seat body and has a second retaining portion for receiving and retaining the other side of the fishing-reel fitting leg portion and is also movable along the longer direction of the seat body, and a nut member which is rotatably coupled to the moving hood and screwed into the seat body and makes the moving hood move along the longer direction of the seat body, and is characterized in that: the moving hood and the nut member respectively have contact surfaces which are brought into contact with each other; the outer sites in the diametral direction of the respective contact surfaces are formed as pressure contact surfaces which are forced to contact each other when the fishing-reel fitting leg portion is clamped between the first and second retaining portions by the clamping and pivotal operation of the nut member with respect to the seat body; and that the inner sites in the diametral direction of the respective contact surfaces are formed into a click mechanism for producing a click sound with an elastic body and an engaging portion with which the elastic body detachably engages therewith during the rotation of the nut member.

In the reel-mounting apparatus according to the first aspect of the invention, no strong stress directly acts on the click mechanism at the time of clamping the nut member. Consequently, a good stable click sound is always obtainable, irrespective of the clamping condition of the nut member. Moreover, the click mechanism is subjected to a long-term use as its durability is prolonged because a load in the pivotal direction is prevented from acting on the click mechanism, so that the nut member is made pivotal smoothly with a light force. As the click mechanism is provided diametrally inside the pressure contact surfaces of the nut member and the moving hood, the click mechanism is shut off the outside in such a state that the nut member has been clamped after the reel is mounted. Therefore, impurities (dust, sand, krill and the like) are prevented from entering the click mechanism, which is also prevented from malfunctioning and also being damaged thereby.

A reel-mounting apparatus for mounting a reel on a fishing rod according to a second aspect of the invention, the moving hood and the nut member have the respective pressure contact surfaces which are forced to contact each other when the fishing-reel fitting leg portion is clamped between the first and second retaining portions by the clamping and pivotal operation of the nut member with respect to the seat body, and non-contact surfaces to which the contact force is not applied; and that each of the non-contact surfaces includes an elastic body and an engaging portion from which the elastic body is detachable and an unexposed click mechanism for producing a click sound when the nut member is rotated.

In the reel-mounting apparatus according to the second spect of the invention, no stress acts on the click mechanism at the time of clamping the nut member. Consequently, a good stable click sound is always obtainable, irrespective of the clamping condition of the nut member. Moreover, the click mechanism is subjected to a long-term use as its durability is prolonged because a load in the pivotal direction is prevented from acting on the click mechanism, so that the nut member is made pivotal smoothly with a light force. As the click mechanism is provided without being exposed outside, the click mechanism is shut off the outside and impurities (dust, sand, krill and the like) are prevented from entering the click mechanism, which is therefore prevented from malfunctioning and also being damaged thereby.

In the reel-mounting apparatus according to a third aspect of the invention, the reel-mounting apparatus is such that the coupling portions of the moving hood and the nut member are externally cylindrical and have substantially the same outer diameter.

The reel-mounting apparatus according to the third aspect of the invention makes the fishing rod easy to grip and handle.

The present disclosure relates to the subject matter contained in Japanese patent application No. Hei. Hei. 11-160802 (filed on Jun. 8, 1999), which is expressly incorporated herein by reference in its entirety.

BRIEF DESCRIPTION OF THE DRAWINGS

FIG. 9 is a sectional side view of a reel seat according to a fourth embodiment of the invention.

DESCRIPTION OF THE PREFERRED EMBODIMENT

Embodiments of the present invention will now be described with reference to the drawings.

Figure 1:
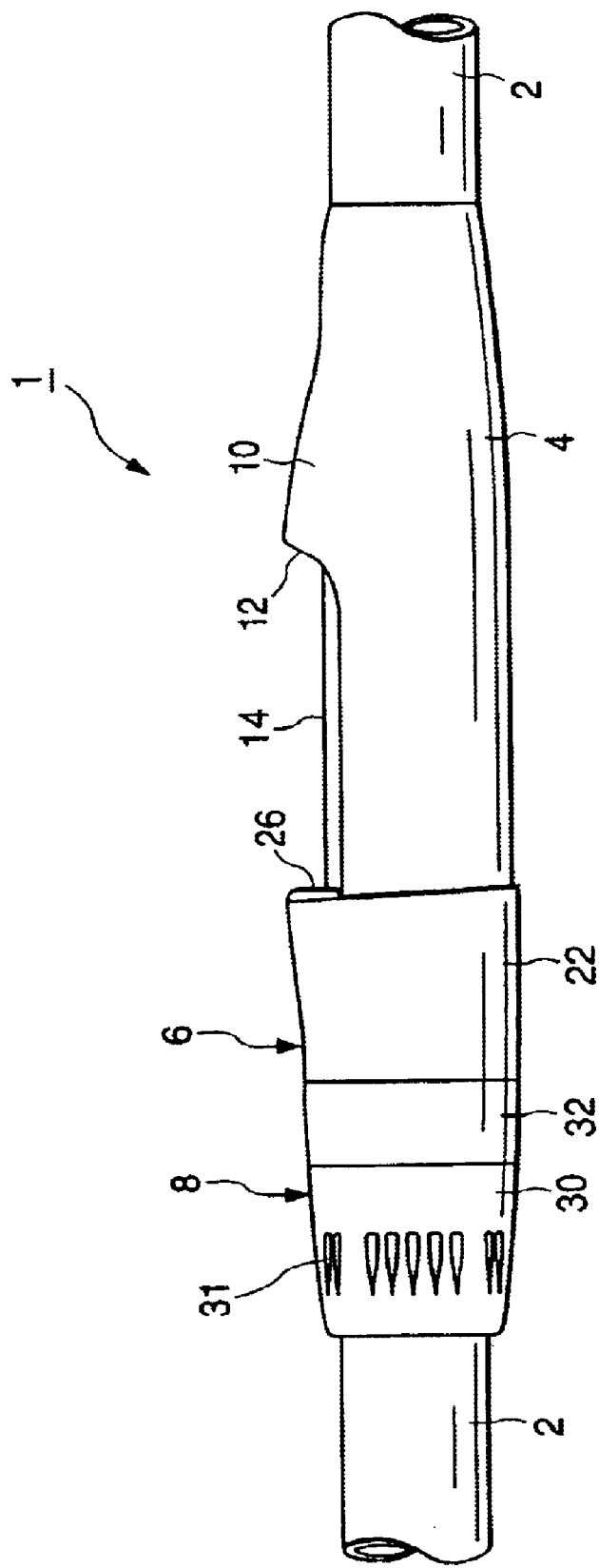
FIG. 1 is a side view of a reel seat according to a first embodiment of the invention.
Figure 2:
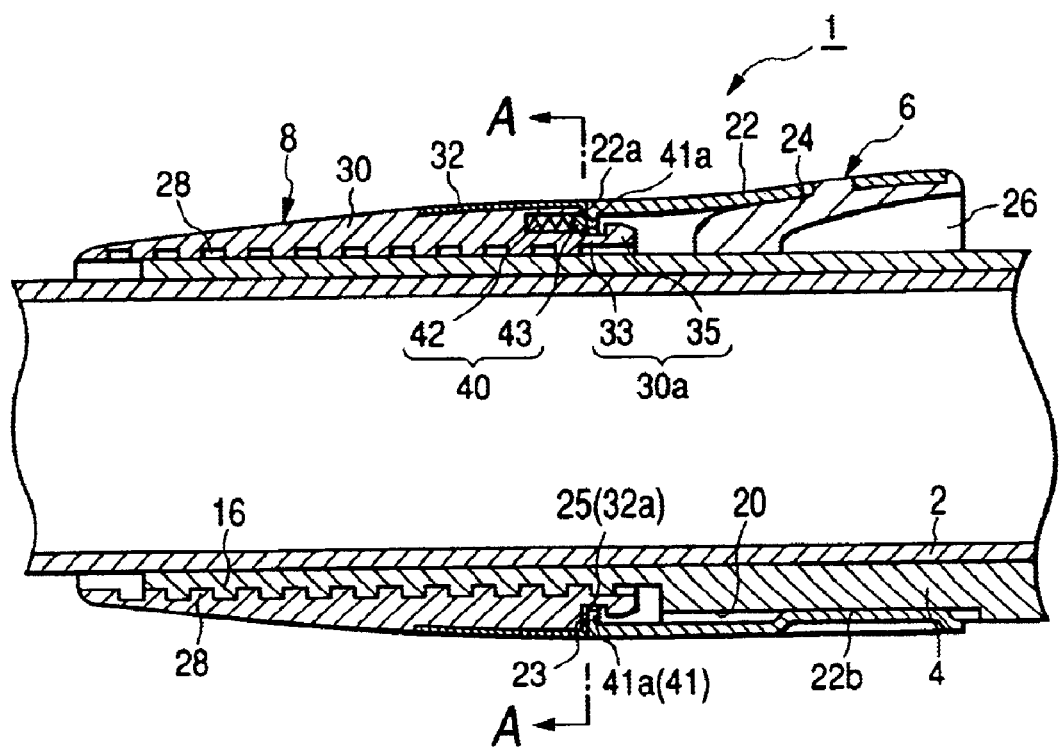
FIG. 2 is a sectional side view of the reel seat of FIG. 1.
Figure 3:
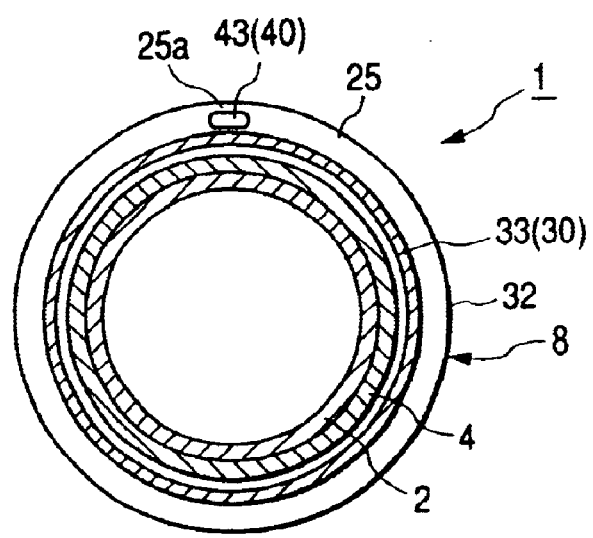
FIG. 3 is a sectional view taken on line A—A of FIG. 2.

FIGS. 1 to 3 and FIG. 6 show a first embodiment of the invention. As shown in FIG. 1, a reel seat 1 as a reel mounting apparatus according to this embodiment of the invention is provided in the hand-grip portion (hand-grip end portion) of a fishing rod 2. As shown in FIGS. 1 to 3, further, the reel seat 1 includes a plastic substantially-cylindrical seat body 4 through which the fishing rod 2 is passed, a moving hood 6 that is mounted on the outer periphery of the seat body 4 and movable along the longer direction of the seat body 4, and a nut member 8 that is coupled to the moving hood 6 and attached to the seat body 4 by screwing and also used to move the moving hood 6 along the longer direction of the seat body 4. Although the seat body 4 is formed separately from the fishing rod 2 and fixed to the fishing rod 2 with an adhesive or the like according to this embodiment of the invention, the seat body 4 may be formed integrally with the fishing rod 2.

A fixed hood 10 as a first retaining portion for receiving and retaining one side of a fishing-reel fitting leg portion (not shown) is formed in the base portion of the seat body 4. This fixed hood 10 has a space in which the reel-fitting leg portion and an opening for use in introducing the fitting leg portion into the space. The seat body 4 is also formed with a reel-leg mounting portion 14 for mounting the fitting leg portion. Further, a male screw 16 is formed in a part of the outer peripheral face on the front end side of the seat body 4. Although it is desirable to form the fixed hood 10, the reel-leg mounting portion 14 and the male screw 16 integrally with the seat body 4, these may be formed separately and the forming of mounting them is optional.

The moving hood 6 includes a cylindrical hood body 22, and a reel-leg receiving portion 24 as a second retaining portion that is secured to the base portion of the hood body 22 and used for receiving and retaining the other side of the fishing-reel fitting leg portion. The reel-leg receiving portion 24 is made of, for example, synthetic resin, and has a space for receiving the reel-fitting leg portion and an opening 26 for use in introducing the reel-fitting leg portion into the space.

The hood body 22 is formed of metal or synthetic resin. The front end of the hood body 22 is bent inward in the diametral direction so as to form a coupling portion 22a that is coupled to the nut member 8. The outer surface of the coupling portion 22a forms an annular contact surface 23 that makes contact with the nut member 8 when the reel is mounted by tightening the nut member 8.

A protrusion 22b protruding diametrally inward is formed in a peripheral part of the base portion of the hood body 22. The protrusion 22b is engaging with a long groove 20 formed along the longer direction of the seat body 4, thus preventing the moving hood 6 from turning with respect to the seat body 4. Consequently, the moving hood 6 is allowed to move only in the axial direction (longer direction) of the seat body 4 without turning with respect to the seat body 4.

The nut member 8 is cylindrical and rotatably mounted on the outer peripheral front end side of the seat body 4. More specifically, the nut member 8 includes a nut body 30 and a reinforcing ring 32 fixed to the outer peripheral face of the base portion of the nut body 30, female screws 28 formed on the inner peripheral face of the nut body 30 engaging with male screws 16 of the seat body 4.

Non-slip irregularities 31 are formed on the outer peripheral face of the nut body 30. A coupling portion 30a engaging with the coupling portion 22a of the moving hood 6 is provided at the base of the nut body 30. This coupling portion 30a is extended from the base edge face of the nut body 30 and includes an extension 33 that is extended from the base edge face of the nut body 30 and insertable into the moving hood 6 via the coupling portion 22a, and an engaging projection 35 that is formed in the end portion of the extension 33 and projects outward in the diametral direction of the extension 33. The engaging projection 35 engages with the coupling portion 22a so that the nut body 30 is allowed to turn with respect to the moving hood 6 and also prevents the nut body 30 from slipping out of the moving hood 6 by coming into contact with the inner face of the coupling portion 22a within the moving hood 6.

The reinforcing ring 32 is formed of metal, particularly a corrosion-resistant one such as SUS, BS, titanium, Al or the like; however, any other kinds of metal, ceramics, synthetic resins or the like may also be employed. The base 32a of the reinforcing ring 32 is diametrally bent inward and extended toward the extension 33 along the base edge face of the nut body 30 and forms an (annular) contact surface 25 of the nut member 8 in contact with the contact surface 23 of the moving hood 6. The base 32a of the reinforcing ring 32 also functions as a support for supporting an elastic body 40, which will be described below.

A click mechanism for producing a click sound during the turning of the nut member 8 is provided in the coupling portion between the moving hood 6 and the nut member 8. This click mechanism includes the elastic body 40 disposed diametrally inward on the contact surface 25 of the nut member 8 (diametrally inward in the intermediate portion of the contact surface 25, see FIG. 3), and a recessed portion 41 as an engaging portion that can engage with the elastic body 40 formed diametrally inward on the contact surface 23 of the moving hood 6. The recessed portion 41 has a plurality of through-holes 41a that are formed at predetermined intervals along the peripheral direction of the coupling portion 22a.

Figure 6:
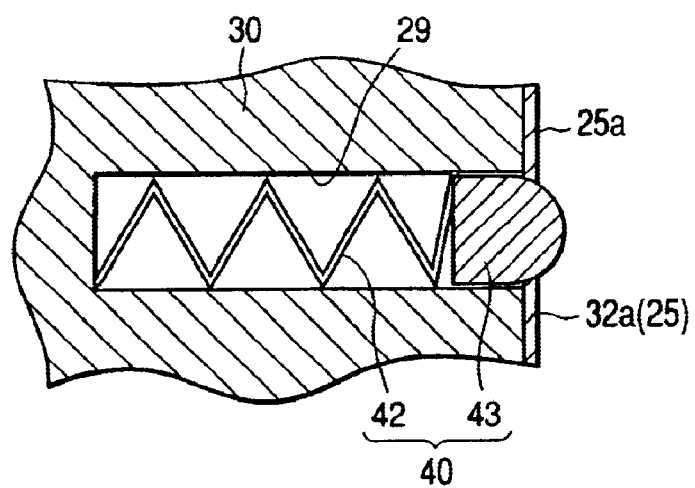
FIG. 6 is an enlarged sectional view of an elastic body forming the click mechanism according to the first embodiment of the invention.

As shown in an enlarged view of FIG. 6, the elastic body 40 includes a spring 42 and a protrusion 43 fixed to the end portion of the spring 42 and is disposed in a hole 29 of the nut body 30. The hole 29 is formed along the longer direction of the nut body 30 and opened diametrally inward in the contact surface 25. The protrusion 43 is usually urged by the spring 42 in the direction of protruding from the opening of the hole 29, that is, in the direction of engaging with the recessed portion 41. The protrusion 43 is supported by the bent base portion 32a of the reinforcing ring 32, so that its protruded quantity is regulated.

The height of the protrusion 43 of the elastic body 40 along the diametral direction of the nut body 30 is set small, whereas the width thereof along the peripheral direction of the nut body 30 is set large. The shape of the protrusion 43 may be set in various ways, for example, spherical. Moreover, the spring 42 of the elastic body 40 may be formed with one elastic material or a combination of a plurality of materials so as to obtain a spring action. Since the protrusion 43 (or the whole elastic body 40) and the recessed portion 41 (or the whole coupling portion 22a) are in a region where both are pressed into contact with each other by the spring force, it is preferred to form them from a corrosion-resistant material, for example, metal of SUS, BS or the like, ceramics, hard resins (of such as ABS or nylon). Needless to say, spring steel or any other material may also be used.

In the click mechanism like this, the number of click sounds per rotation of the nut member 8 is determined by the number of recessed portions 41 engaging with the protrusion 43, that is, by the number of through-holes 41a formed along the peripheral direction of the coupling portion 22a of the moving hood 6. According to this embodiment of the invention, the number of through-holes 41a is set within the range of 20 to 36. When 36 of through-holes 41a exist, the click sound is produced once each time the nut member 8 is turned by 10 degrees, whereas when 20 of through-holes 41a exist, the click sound is produced once each time the nut member 8 is turned by 18 degrees. By setting the number of through-holes 41a within the range of 20 to 36, the tightened condition of the nut member 8 can easily be sensed from the click sound and can also easily be managed. Needless to say, the number of through-holes 41a (the number of click sounds to be generated) may be set to less than 20 or greater than 36. In a case where the number of click sounds to be generated per rotation of the nut member 8 is increased (the number of through-holes 41a exceeds 36), an angle of rotation would become difficult to judge when the nut member 8 is turned. In a case where the number of click sounds to be generated is decreased (the number of through-holes 41a is less than 20), it is undesirable because the angle of rotation of the nut member 8 would become too large to generate the click sound.

The regions of the nut member 8 and the moving hood 6 where the click mechanism is disposed are set to 3 mm or thicker, preferably range from 5 mm±2 mm in wall thickness. Further, the regions of the nut member 8 and the moving hood 6 where the click mechanism is disposed range from 20 mm to 33 mm, preferably from 21 mm to 29 mm in outer diameter. Moreover, the outer diameters of the regions of the nut member 8 and the moving hood 6 where the click mechanism is disposed are set substantially equal (difference in level being within 0.5 mm) in order to minimize the difference in level on the outer peripheral face of the connection therebetween. Needless to say, these dimensions are not restricted to those mentioned above but may be set greater or otherwise smaller.

A method of mounting the reel on the fishing rod by using the reel seat 1 thus arranged will now be described.

First, the nut member 8 is loosen with respect to the seat body 4 by turning the nut member 8 in one direction away from the fixed hood 10 and moving the moving hood 6 together with the nut member 8 toward the front end side (the tip side of the rod). Then the reel-fitting leg portion (not shown) is mounted in the reel-leg mounting portion 14, and one side of the reel-fitting leg portion is inserted into the fixed hood 10 and retained thereby.

Then the nut member 8 is turned in the other direction and tightened with respect to the seat body 4, and the moving hood 6 together with the nut member 8 is moved closer to the fixed hood 10 toward the base end side (the hand-grip side). As the rotation of the moving hood 6 has been regulated with respect to the seat body 4 because the protrusion 22b is kept in engagement with the long groove 20, the moving hood 6 is moved along the axial direction (longer direction) of the seat body 4 without rotating relative to the seat body 4. Consequently, the protrusion 43 of the elastic body 40 provided on the nut member 8 repeatedly collides with the through-hole 41a on the side of the moving hood 6, thus producing the click sound.

The nut member 8 is further turned in this condition and the other wide of the reel-fitting leg portion is inserted into the reel-leg receiving portion 24 before being retained thereby. When the nut member 8 is strongly tightened, the diametral outer side portion of the contact surface 23 of the moving hood 6 and the diametral outer side portion 25a (see FIG. 3) of the contact surface 25 of the nut member 8 are forced to contact each other. Further, the reel-fitting leg portion is strongly clamped between the moving hood 6 and the fixed hood 10, whereby the reel is fixed to the fishing rod 2 via the reel seat 1. When the nut member 8 is turned in the above condition, the click sound is produced, so that the slackness of the nut member 8 can be decided immediately.

As set forth above, the click mechanism is provided on the diametral inner sides of the contact surfaces 23 and 25 of the moving hood 6 and the nut member 8, and the diametral outer side portions of the contact surfaces 23 and 25 practically function as pressure contact surfaces in the reel seat 1 according to this embodiment of the invention. In other words, the click mechanism is not provided in the diametral outer side regions (pressure contact surfaces) of the contact surfaces 23 and 25 to which the tightening force of the nut member 8 is directly applied. Therefore, strong stress resulting from tightening the nut member 8 will not directly act on the click mechanism to ensure that a good, stable click sound is always obtainable, irrespective of the tightening condition of the nut member 8. Since no great pivotal load acts on the click mechanism, excellent durability of the click mechanism makes possible long-term use and the smooth operation of pivoting the nut member 8 with small force.

In case falling and idling exist between the nut member 8 and the moving hood 6, no load will act on the click mechanism from an abnormal direction because the protrusion 43 and the recessed portion 41 engage with each other after the diametral outer side regions of the contact surfaces 23 and 25 are forced to contact each other.

Provision of the click mechanism on the diametral inner sides of the pressure contact surfaces (the diametral outer side portions of the contact surfaces 23 and 25) of the nut member 8 and the moving hood 6 causes the click mechanism to be completely shut of from the outside in such a condition that the reel has been mounted and that the nut member 8 has been tightened (the click mechanism being sealed inside the moving hood 6 and the nut member 8 and protected as it is not exposed outwardly). Therefore, impurities (dust, sand, krill and the like) are prevented from entering the click mechanism, whereby the click mechanism is restrained from malfunctioning and being damaged.

Further, the outer diameters of the regions of the nut member 8 and the moving hood 6 where the click mechanism is disposed are set substantially equal (difference in level being within 0.5 mm, preferably within 0.2 mm whereby to prevent the R-shaped end portion from hurting the hand) in order to minimize (or eliminate) the difference in level on the outer peripheral face of the connection therebetween in the reel seat 1 according to this embodiment of the invention. Moreover, the regions of the nut member 8 and the moving hood 6 where the click mechanism is disposed are set to 3 mm or thicker, preferably from 5 mm±2 mm in wall thickness. Further, the regions of the nut member 8 and the moving hood 6 where the click mechanism is disposed range from 20 mm to 33 mm, preferably from 21 mm to 29 mm in outer diameter. Accordingly, the click mechanism is easy to install, grip and operate.

As the contact surface 25 of the nut member 8 of the reel seat 1 according to this embodiment of the invention is formed with the reinforcing ring 32, the strength of the contact surface 25 (the pressure contact surface 25a in particular) can be improved. Needless to say, the nut body 30 (or the base edge face of the nut body 30) may be formed of a high-strength member. Forming the nut body 30 using synthetic resin may be made lighter and easy to manufacture.

The protrusion 43 of the elastic body 40 of the reel seat 1 according to this embodiment of the invention is supported by the base end 32a (a support) bent inward in the diametral direction of the reinforcing ring 32. Therefore, the elastic body 40 can be protected and the operation and operating quantity of the protrusion 43 can also be stabilized.

Further, the protrusion 43 of the elastic body 40 of the reel seat 1 according to this embodiment of the invention is set small in height along the diametral direction of the reinforcing ring 32 and great in width along the peripheral direction of the nut body 30. Consequently, the nut member 8 can easily be pivoted and the click mechanism can also be made-smaller diametrally by rendering gentler the contact angle between the protrusion 43 and the recessed portion 41.

According to this embodiment of the invention, the hood body 22 may be formed of the same material as that of the nut member 8. In the click mechanism according to this embodiment of the invention, though the elastic body 40 has been provided on the nut member 8 with the recessed portion 41 provided on the moving hood 6, this arrangement order may be reversed (see a second embodiment thereof as will be described below). Moreover, the elastic body 40 and the recessed portion 41 need not to be provided directly to the moving hood 6 and the nut member 8 but may be provided thereto via other members, for example.

Figure 7:
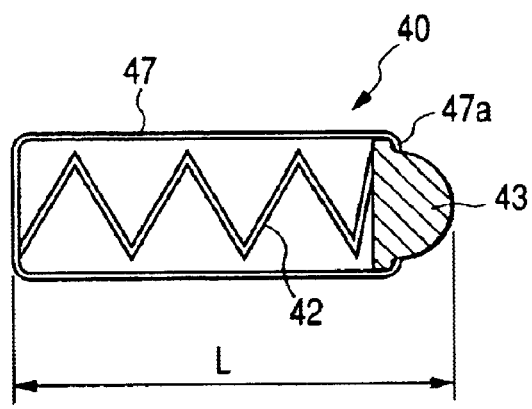
FIG. 7 is a sectional view of a modified embodiment of the elastic body of FIG. 6.

The click mechanism may be in any form as long as the click sound is produced when it protrusion 43 is urged to the recessed portion 41 on the moving hood 6 and may be formed with one part or a plurality of parts in combination. As shown in FIG. 7, the elastic body 40 may be formed as one unit. In other words, the elastic body 40 shown in FIG. 7 comprises a support cover 47, the spring 42 contained in the support cover and the protrusion 43 positioned in the support cover 47 and urged by the spring 42. The protrusion 43 is supported by the bent end portion 47a of the support cover 47, whereby the protrusion 43 is prevented from slipping off the support cover 47 and simultaneously its operation and operating quantity are stabilized. Thus, forming the elastic body 40 into a unit allows the elastic body 40 as a unit to be fitted in and taken out of the hole 29 of the nut body 30, so that the elastic body 40 can be assembled and replaced smoothly. In a case where the distance L between the inner bottom end portion of the support cover 47 and the front end of protrusion 43 is set in a range of as long as 10 mm or greater, the click sound can be made greater.

Figure 4:
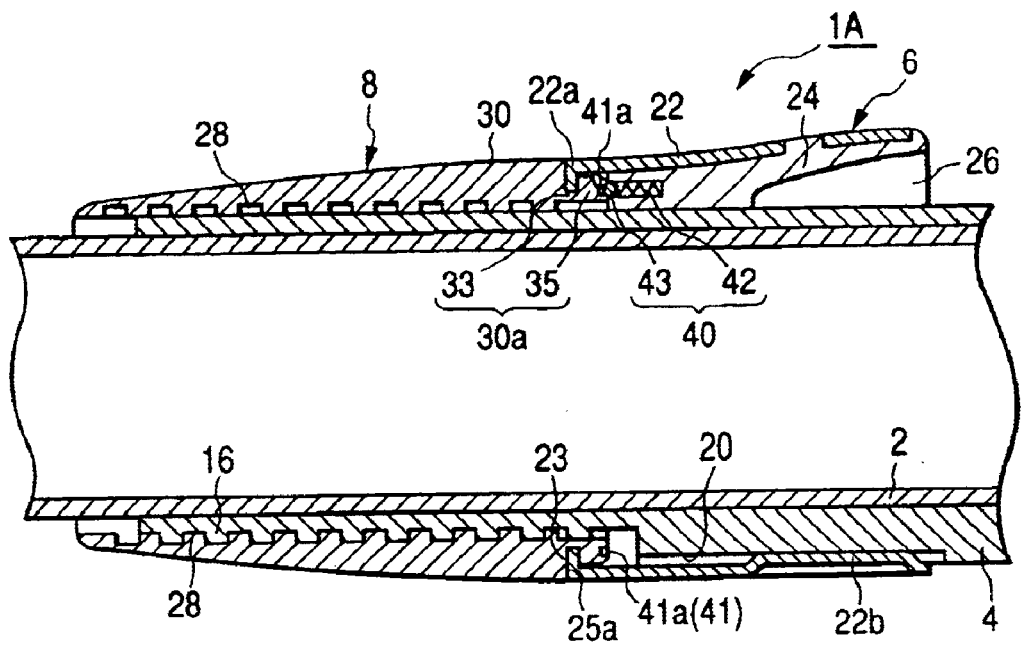
FIG. 4 is a sectional side view of a reel seat according to a second embodiment of the invention.

FIG. 4 shows a second embodiment of the invention, wherein like reference characters designate corresponding to component parts in the first embodiment thereof and the description thereof will be omitted.

The nut body 30 of a reel seat 1A according to this embodiment of the invention is formed of high-strength material (metal, synthetic resins, fiber reinforced synthetic resins, etc). Therefore, the reinforcing ring 32 (see FIG. 2) as in the first embodiment thereof is not provided to the nut member 8. Further, the base edge face of the nut body 30 forms the pressure contact surface 25a forced to contact the contact surface 23 of the coupling portion 22a with the bent moving hood 6 when the nut body 30 is tightened. In other words, the whole contact surface 23 of the coupling portion 22a of the moving hood 6 forms a pressure contact surface.

The engaging projection 35 of the coupling portion 30a of the nut body 30 is brought into light contact with the front edge face of the reel-leg receiving portion 24 (or slightly separated therefrom). In this case, the clamping force of the nut member 8 is applied to only the pressure contact surfaces 23 and 25a but the clamping force is not almost nearly (or not entirely) applied to the contact surface between the front edge faces of the engaging projection 35 and the reel-leg receiving portion 24. In other words, the front edge faces of the engaging projection 35 and the reel-leg receiving portion 24 form as those which are forced to contact each other.

In the click mechanism, the spring 42 and protrusion 43 of the elastic body 40 are provided in reel-leg receiving portion 24, and the recessed portion 41 (through-hole 41a) engaging with the protrusion 43 is formed in the engaging projection 35 on the nut body 30, so that the arrangement of them is reversed in order as compared with the first embodiment of the invention. The structure of building in the elastic body 40 is entirely the same as what is shown in FIG. 6 except that the hole 29 if formed in the reel-leg receiving portion 24.

The outer diameters of the pressure contact portions of the nut member 8 and the moving hood 6 are set substantially equal so that there may be substantially almost nearly no (or entirely no) difference in level on the outer peripheral face of the connection therebetween (the difference in level may be within 0.5 mm, preferably within 0.2 mm with the end portion in an R form so as to prevent the hand from being hurt). With respect to the nut member 8 and the moving hood 6, the outer diameter of each pressure contact portion is set in the range of 20 mm to 33 mm, preferably 21 mm to 29 mm. The arrangement other than the aforementioned is similar to what is defined in the first embodiment of the invention.

With arrangement above, the whole pressure contact surface 23 of the moving hood 6 is forced to contact the whole pressure contact surface 25a of the nut member 8 when the nut member 8 is strongly tightened while the reel-fitting leg portion is held between the moving hood 6 and the fixed hood 10. However, no pressure contact force acts on the contact surface where the non-pressure contact surface disposed in the click mechanism, that is, the contact surface where the front edge faces of the engaging projection 35 and the reel-leg receiving portion 24 are brought into contact with each other.

The click mechanism of the reel seat 1A according to this embodiment of the invention is positioned inward in the diametral direction of pressure contact surfaces 23 and 25a and provided to the non-pressure contact surface to which no pressure contact force is applied. Consequently, no stress acts on the click mechanism during the tightening operation of the nut member 8, so that an excellent click sound is always obtainable stably without depending on the tightening condition of the nut member 8. Moreover, the durability of the click mechanism is improved and its long-term use becomes possible while the nut member 8 can be pivoted smoothly with a light torque because no pivotal load is applied to the click mechanism. Any other effect of the invention is similar to what has been described in the first embodiment of the invention.

Figure 5:
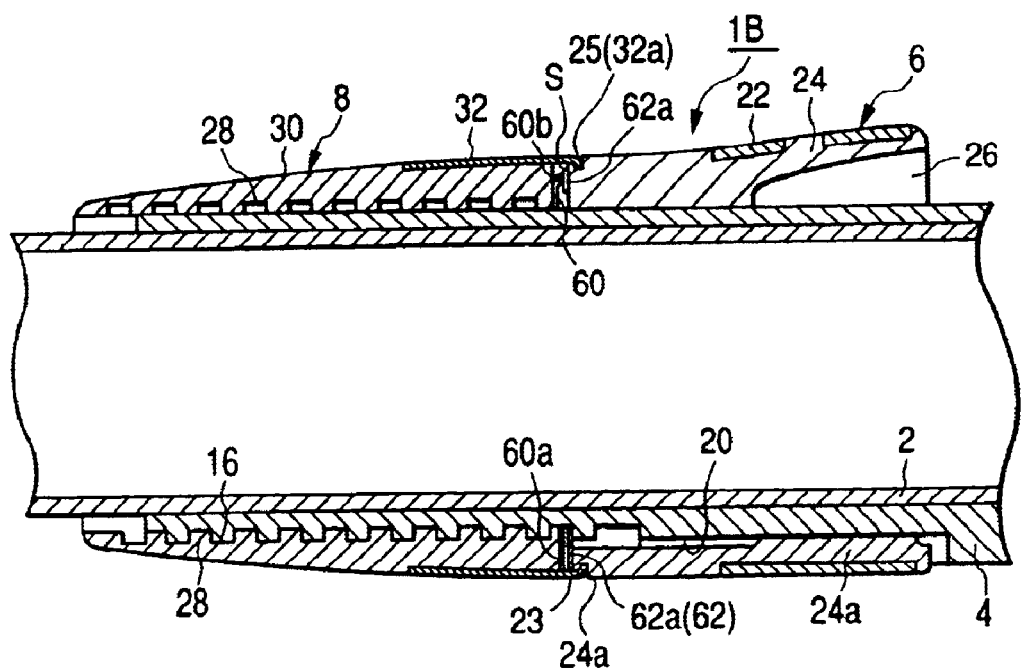
FIG. 5 is a sectional side view of a reel seat according to a third embodiment of the invention.
Figure 8A:
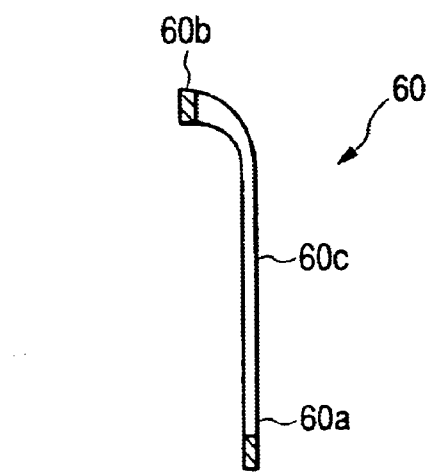
FIG. 8(a) is a sectional side view of the elastic body forming the click mechanism in the third embodiment of the invention.
Figure 8B:
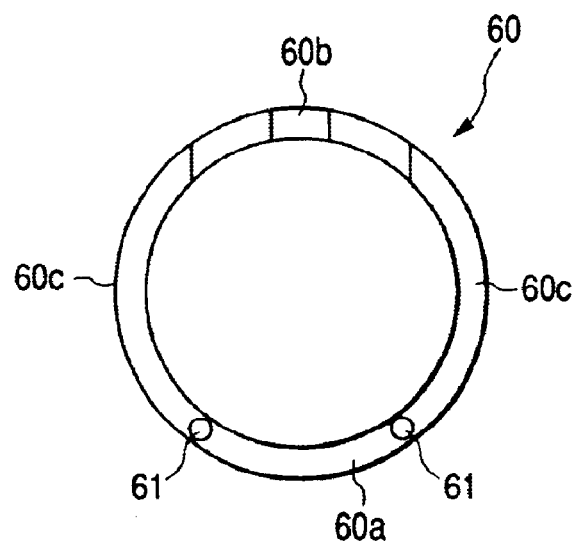
FIG. 8(b) is an elevational view of the elastic body in (a).

FIGS. 5 and 8 show a third embodiment of the invention, wherein, like reference characters designate those corresponding to component parts in the first embodiment thereof and the description thereof will be omitted.

AS shown in FIG. 5, there is formed a recessed portion 24a in the front outer peripheral face of the reel-leg receiving portion 24. In this case, the edge face of the recessed portion 24a forms the pressure contact surface 23 forced to contact the nut member 8. Moreover, the bent base end 32a of the reinforcing ring 32 engages with the recessed portion 24a of the reel-leg receiving portion 24 so that a predetermined clearance S can be formed between the base edge face of the nut body 30 and the front edge face of the reel-leg receiving portion 24. Accordingly, the pressure contact surface 25 forced to contact the pressure contact surface 23 of the recessed portion 24a is formed when the nut member B is tightened.

The click mechanism is provided in the clearance between the base edge face of the nut body 30 and the front edge face of the reel-leg receiving portion 24. The click mechanism includes an elastic body 60 disposed in the clearance S and a recessed portion 62 that is formed on the front edge face of the reel-leg receiving portion 24 and engages with the elastic body 60. Further, the recessed portion 62 also includes a plurality of holes 62a that are formed at predetermined intervals along the peripheral direction of the front edge face of the reel-leg receiving portion 24.

As shown FIG. 8 in detail, the elastic body 60 is formed with a ring-shaped plate material and includes a lower end portion 60a having a fixed portion 61 that is fixed to the nut body 30, an extended portion 60c peripherally projecting forward from the lower end portion 60a and a protrusion 60b protruding from the extended portion 60c and engaging with the recessed portion 62. The lower end portion 60a is fixed to the front edge face of the nut body 30 with its fixed portion 61 fixed by machine screws, fitting, press-fitting or the like and kept in contact with the reinforcing ring 32. The extended portion 60c is formed over the semicircle of the elastic body 60 and set in a free condition within the clearance S so as to have spring properties that make the protrusion 60b engage with the recessed portion 62 (forward in the axial direction of the moving hood 6).

As set forth above, the click mechanism is provided on the reel seat 1B according to this embodiment of the invention in such a way as to provide the click mechanism over the base edge face of the nut body 30 and the front edge face of the reel-leg receiving portion 24 that are not forced to contact each other, so that the same effect as what is obtainable from the second embodiment of the invention can be obtained. Since the extended portion 60c of the elastic body 60 is disposed in the free condition within the clearance S with the spring properties that make the protrusion 60b engage with the recessed portion 62, the click sound can be caused to a greater extent. Moreover, the operation of pivoting the nut member 8 can also be performed smoothly. In this embodiment of the invention in particular, the lower end portion 60a of the elastic body 60 is so disposed as to contact the reinforcing ring 32. Therefore, the click sound becomes easy to be transmitted to the reinforcing ring 32 where the hand and fingers are always touched, so that touching the reinforcing ring 32 makes it easier to sense the click sound. According to this embodiment of the invention, however, the elastic body 60 and the reinforcing ring 32 may be formed integrally.

FIG. 9 shows a fourth embodiment of the invention. This embodiment of the invention refers to a case where the third embodiment thereof is applied to a reel seat having a trigger casting handle. Therefore, like reference characters designate those corresponding to component parts in the first and third embodiments of the invention and the description thereof will be omitted.

The recessed (hole) portion 62a engaging with the protrusion 60b of the elastic body 60 of a reel seat 1C according to this embodiment of the invention is formed in an annular engaging member 73 secured to the front edge face of the reel-leg receiving portion 24. Further, a hollow portion 79 for increasing the acoustic effect of the click sound is provided to each of the sites facing the respective hole portions 62a in the reel-leg receiving portion 24. A trigger 74 is formed in the reel seat body 4, and a grip 75 is secured thereto. Moreover, a grip 70 made of a soft member such as cork and a foaming agent is secured to the nut body 30. Since any other components are similar to those described in the third embodiment of the invention, the same effect as what has been described in the third embodiment thereof will be obtainable.

Figure 10:
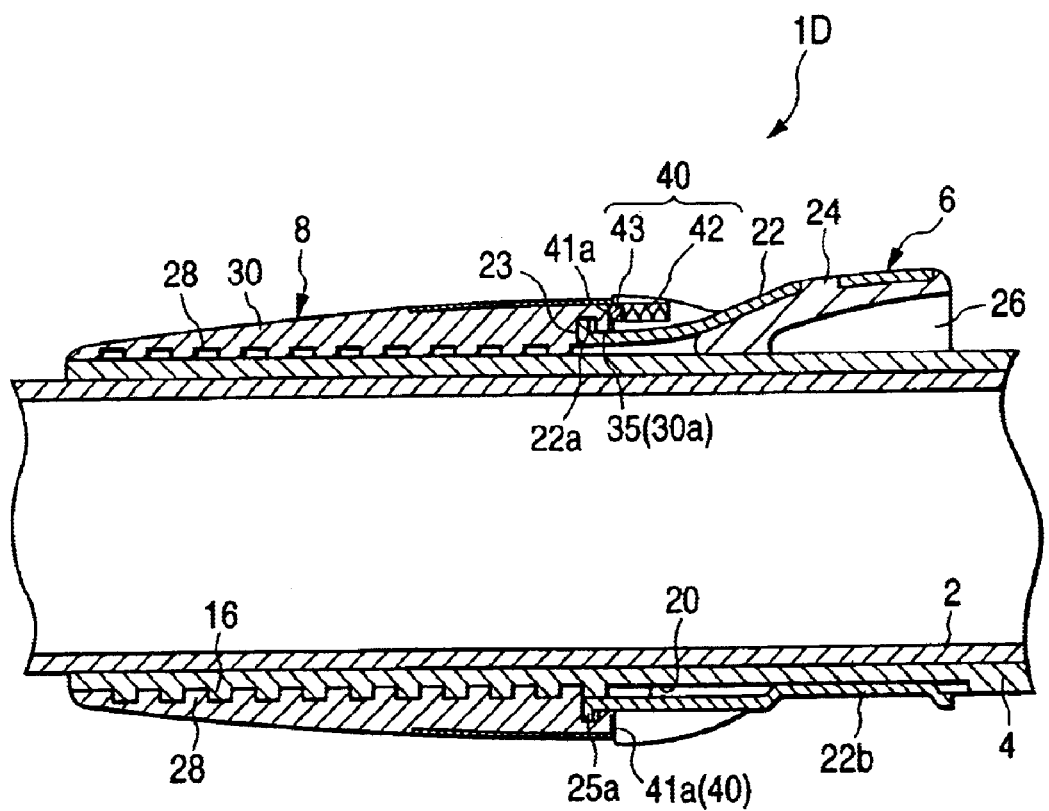
FIG. 10 is a sectional side view of a reel seat according to a fifth embodiment of the invention.

FIG. 10 shows a fifth embodiment of the invention which is a modified embodiment of the second embodiment thereof, wherein the engaging condition between the coupling portion 22a of the moving hood 6 and the coupling portion 30a of the nut member 8 is set upside down and the click mechanism is disposed outwardly in the diametral direction of the pressure contact surfaces 23 and 25a. However, the click mechanism is arranged so that it may not be exposed partially outside the nut member 8 and the moving hood 6. As any part other than those mentioned above are similar to those described in the second embodiment of the invention, like reference characters designate those corresponding to like component parts and the description thereof will be omitted.

As set forth above, according to the invention, it is possible to provide a reel-mounting apparatus that is capable of always causing a good click sound and excellent in durability as well as operability without causing any malfunction resulting from the intrusion of impurities.

What is claimed is:

1. An apparatus for mounting a reel on a fishing rod, said apparatus comprising:

a seat body having a first retaining portion which is provided to the fishing rod and used for receiving and retaining one side of a fishing-reel fitting leg portion, a moving hood which is fitted to the outer periphery of the seat body and has a second retaining portion for receiving and retaining the other side of the fishing-reel fitting leg portion and is also movable along the longer direction of the seat body, and a nut member which is rotatably coupled to the moving hood and screwed into the seat body and makes the moving hood move along the longer direction of the seat body, wherein:

the moving hood and the nut member respectively have contact surfaces which are brought into direct contact with each other;

radially outer portions of the respective contact surfaces are formed as pressure contact surfaces which are forced to contact each other when the fishing-reel fitting leg portion is clamped between the first and second retaining portions by the clamping and pivotal operation of the nut member with respect to the seat body; and radially inner portions of the moving hood and nut member proximate to the radially outer portions of the respective contact surfaces are forming a click mechanism for producing a click sound with an elastic body and an engaging portion with which the elastic body detachably engages during the rotation of the nut member, wherein the click mechanism is unexposed to external environment.

2. An apparatus for mounting a reel on a fishing rod, said apparatus comprising:

a seat body having a first retaining portion which is provided to the fishing rod and used for receiving and retaining one side of a fishing-reel fitting leg portion, a moving hood which is fitted to the outer periphery of the seat body and has a second retaining portion for receiving and retaining the other side of the fishing-reel fitting leg portion and is also movable along the longer direction of the seat body, and a nut member which is rotatably coupled to the moving hood and screwed into the seat body and makes the moving hood move along the longer direction of the seat body, characterized in that:

the moving hood and the nut member have respective pressure contact surfaces which are forced to directly contact each other when the fishing-reel fitting leg portion is clamped between the first and second retaining portions by the clamping and pivotal operation of the nut member with respect to the seat body, and non-contact surfaces to which the contact force is not applied; and that each of the non-contact surfaces includes an elastic body and an engaging portion from which the elastic body is detachable and an unexposed click mechanism for producing a click sound when the nut member is rotated, wherein the click mechanism is unexposed to external environment.

3. An apparatus for mounting a reel on a fishing rod as claimed in claim 2, wherein the moving hood and the nut member are such that their coupling portions therebetween are externally cylindrical and have substantially the same outer diameter.

4. A reel seat comprising:

a main body;

a pair of hoods, at least one of said hoods is movable relative to said main body;

a nut member, threadingly engaged with said main body, for moving said movable hood relative to said main body by rotation and associated movement of said nut member relative to said main body;

a closed chamber defined between two of said main body, said movable hood and said nut member; and a click sound generation mechanism installed inside said nut member within said closed chamber for generating click sound using relative movement between said two of said main body, said movable hood and said nut member, wherein said click sound generation mechanism includes recesses, a coiled spring; a protrusion on an end of said coiled spring and engageable with one of said recesses.

5. A reel seat comprising:

a main body;

a pair of hoods, at least one of said hoods is movable relative to said main body;

a nut member, threadingly engaged with said main body, for moving said movable hood relative to said main body by rotation and associated movement of said nut member relative to said main body;

a closed chamber defined between two of said main body, said movable hood and said nut member; and a click sound generation mechanism installed inside said nut member within said closed chamber for generating click sound using relative movement between said two of said main body, said movable hood and said nut member, wherein said closed chamber is axially located between said two of said main body, said movable hood and said nut member.

6. The reel seat according to claim 4, wherein the closed chamber is defined between the main body and the nut member.

7. The reel seat according to claim 4, wherein the recesses, the coiled spring, and the protrusion are provided to members other than the pair of hoods and the nut member.

8. The reel seat according to claim 4, wherein the recesses, the coiled spring, and the protrusion are arranged in an axial direction of the main body.

* * * * *